(12) United States Patent
Brazelton

(10) Patent No.: US 7,500,778 B2
(45) Date of Patent: Mar. 10, 2009

(54) POLYMER MIXING APPARATUS

(76) Inventor: Carl Brazelton, P.O. Box 428, Bradley, IL (US) 60915

( * ) Notice: Subject to any disclaimer, the term of this patent is extended or adjusted under 35 U.S.C. 154(b) by 682 days.

(21) Appl. No.: 11/229,997

(22) Filed: Sep. 19, 2005

(65) Prior Publication Data

US 2007/0064524 A1    Mar. 22, 2007

(51) Int. Cl.
*B01F 7/10* (2006.01)
(52) U.S. Cl. .............. 366/164.6; 366/178.1; 366/182.4; 366/264
(58) Field of Classification Search .............. 366/164.6, 366/178.1, 182.4, 264; 425/225; 422/225
See application file for complete search history.

(56) References Cited

U.S. PATENT DOCUMENTS

| | | | | |
|---|---|---|---|---|
| 1,726,125 A | * | 8/1929 | Rowand | 366/164.3 |
| 2,641,453 A | * | 6/1953 | Teale | 366/178.1 |
| 3,318,580 A | * | 5/1967 | Simonetti | 366/172.2 |
| 3,744,763 A | * | 7/1973 | Schnoring et al. | 366/178.1 |
| 3,756,570 A | * | 9/1973 | Buhner | 33/270 |
| 5,018,871 A | * | 5/1991 | Brazelton et al. | 366/169.1 |
| 5,061,456 A | | 10/1991 | Brazelton et al. | |
| 5,135,968 A | * | 8/1992 | Brazelton et al. | 523/313 |
| 5,358,329 A | | 10/1994 | Plache et al. | |
| 2002/0101783 A1 | * | 8/2002 | Hasberg et al. | 366/172.1 |
| 2004/0213080 A1 | * | 10/2004 | Schertenleib | 366/171.1 |

* cited by examiner

*Primary Examiner*—David L Sorkin
(74) *Attorney, Agent, or Firm*—Greer, Burns & Crain, Ltd.

(57) ABSTRACT

Polymer mixing apparatus strips oil from polymers in an oil phase continuous emulsion and at least partially hydrates the polymers by injecting the emulsion and a pressured aqueous solution into a mixing zone. The emulsion and solution are passed through a confined space, where the oil is stripped from the polymer molecules and at least partially hydrated. The resulting solution is removed from the confined space without recirculation through the confined space.

13 Claims, 3 Drawing Sheets

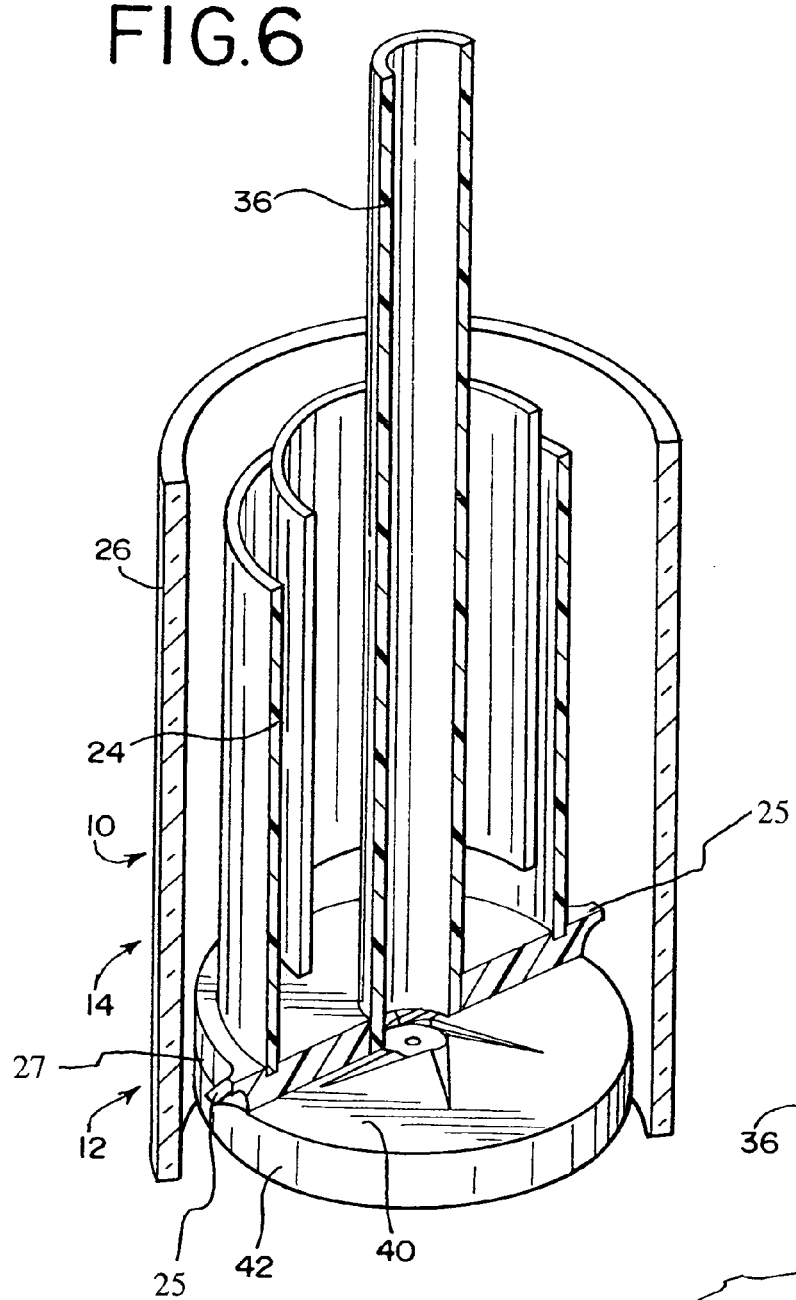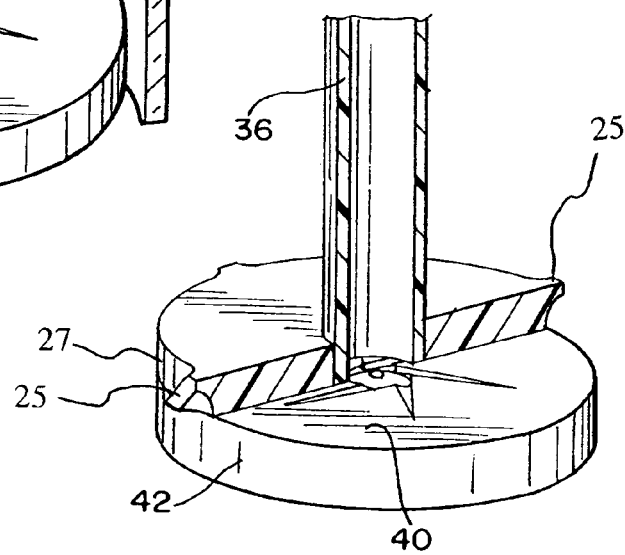

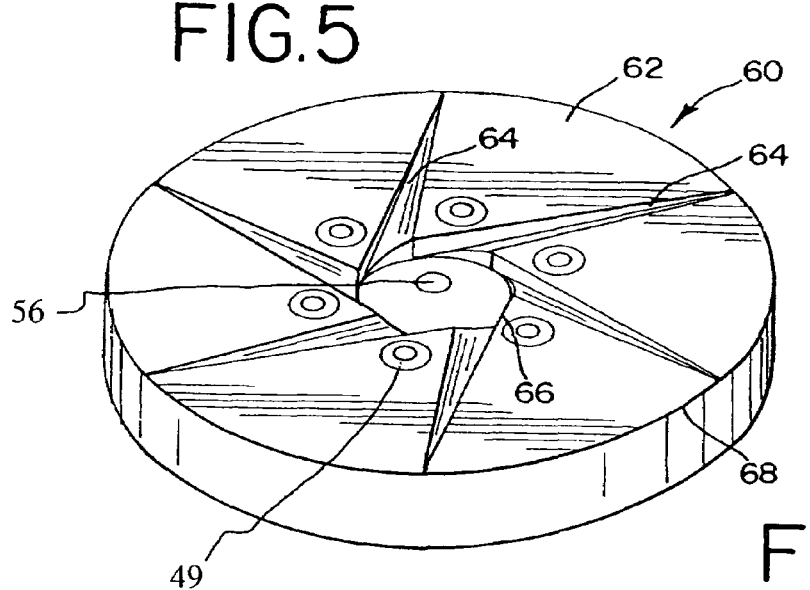
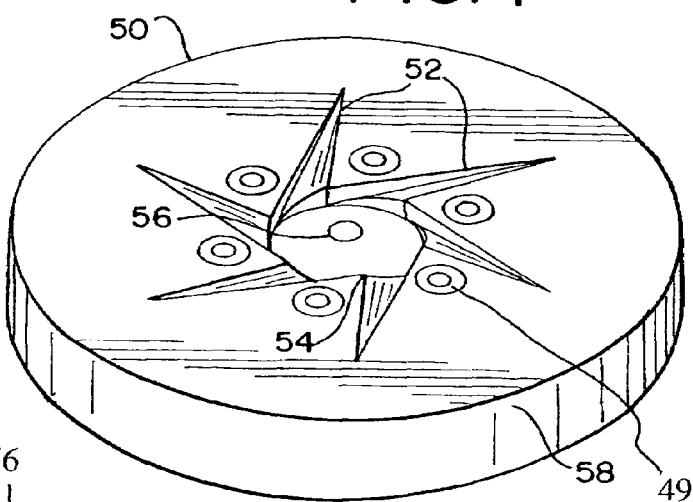
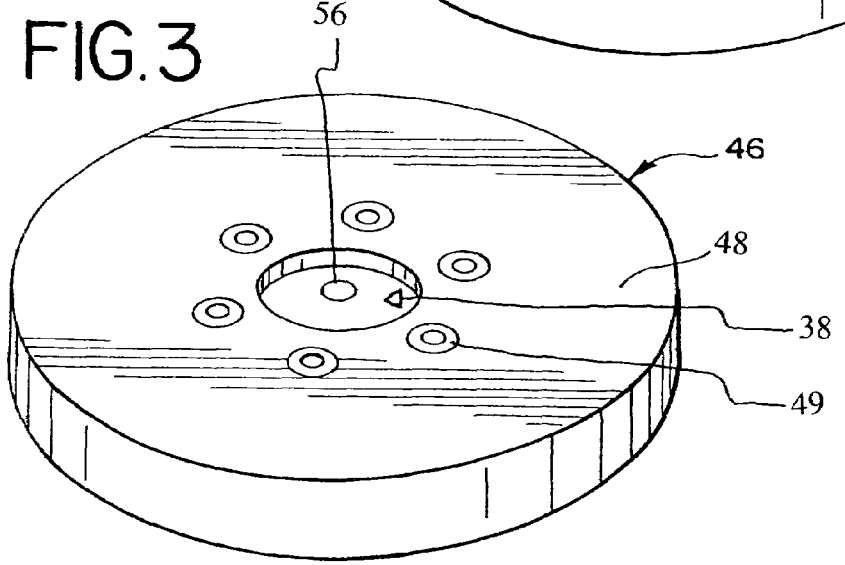

POLYMER MIXING APPARATUS

This invention relates to polymer mixing devices, and more particularly, to devices that invert an oil phase continuous (reverse) emulsion containing polymer molecules to a water phase continuous (straight) emulsion, effectively removing the oil from the polymer molecules and hydrating the molecules, so the polymer molecules can be activated and used in purifying water.

BACKGROUND OF THE INVENTION

The use of liquid (emulsion) polyelectrolytes in water, wastewater and papermaking applications began to proliferate in the early 1980's. Polyelectrolytes are useful for removing fine particulate matter from water.

Initially, traditional batch systems were used to dilute and activate the new polyelectrolytes, commonly called polymers. Typical batch systems use one or more 50-5000 gallon tanks. A measured amount of polymer in an oil-based emulsion is dumped or pumped into the tanks, which contain water, with a propeller mixer running. The mixing action of the propeller strips some of the oil from the polymer molecules, called inversion, allowing the molecules to absorb water. After some period of time (10-30 min.) the mixer is turned off and the solution is allowed to "age" for an additional 30-60 minutes. Aging allows the polymer molecules to open and extend, called activation, exposing ionic sites to the water.

After aging, the solution is dosed into water containing suspended solids. The ionic sites attract and grasp suspended particles in the water, and the particles settle to the bottom of the water, leaving the water in a cleaner condition. Batch systems have several problems, though. Inversion is incomplete, and the impact of the propeller damages many of the polymer molecules. Activation is slow and cumbersome, and the process is inefficient overall.

In-line systems for activating the new liquid polymers began to appear in about 1982 and gained fairly rapid acceptance in the marketplace. In-line systems invert the emulsion and activate the polymer, fairly continuously moving the inverted solution until it leaves the system. In-line systems do not use aging tanks and offer savings in space required, installed cost and cost of operation. While they address some of the problems found in batch systems, though, they only solve them to some extent, as the shear forces they create lack uniformity, which limits the degree of activation achieved.

Thus, there is a need for a polymer mixing apparatus that more uniformly inverts an oil-phase continuous polymer emulsion to a water phase continuous emulsion, more fully exposing the polymer molecules to activating water.

Accordingly, one object of this invention is to provide new and improved polymer mixing devices.

Another object is to provide new and improved polymer mixing devices that more fully and uniformly strip oil from polymers, which allows the polymer to hydrate in an aqueous solution.

Still another object is to provide new and improved polymer mixing devices which cause less damage to the polymer molecules in the process of inversion and activation.

SUMMARY OF THE INVENTION

In keeping with one aspect of this invention, apparatus for stripping oil from polymers in an oil phase continuous emulsion and at least partially hydrating the polymer molecules injects the oil-based emulsion and a pressurized aqueous solution into a mixing zone. The resulting solution is passed from the mixing zone through a confined space, where the oil is stripped from the polymer molecules and the polymer molecules are at least partially hydrated. The solution is removed from the confined space without recirculation through the confined space.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 2 is a partially cut-a-way detail view of the water conduit, stator disk and impeller used in the device of FIG. 1;

FIG. 3 is a perspective view of an impeller which can be used in the device of FIG. 1;

FIG. 4 is a perspective view of another embodiment of an impeller, which is shown in the device of FIG. 1;

FIG. 5 is a perspective view of another embodiment of an impeller, which can be used in the device of FIG. 1; and FIG. 6 is a cut-a-way view of a portion of the device of FIG. 1.

DETAILED DESCRIPTION

Figure 1:
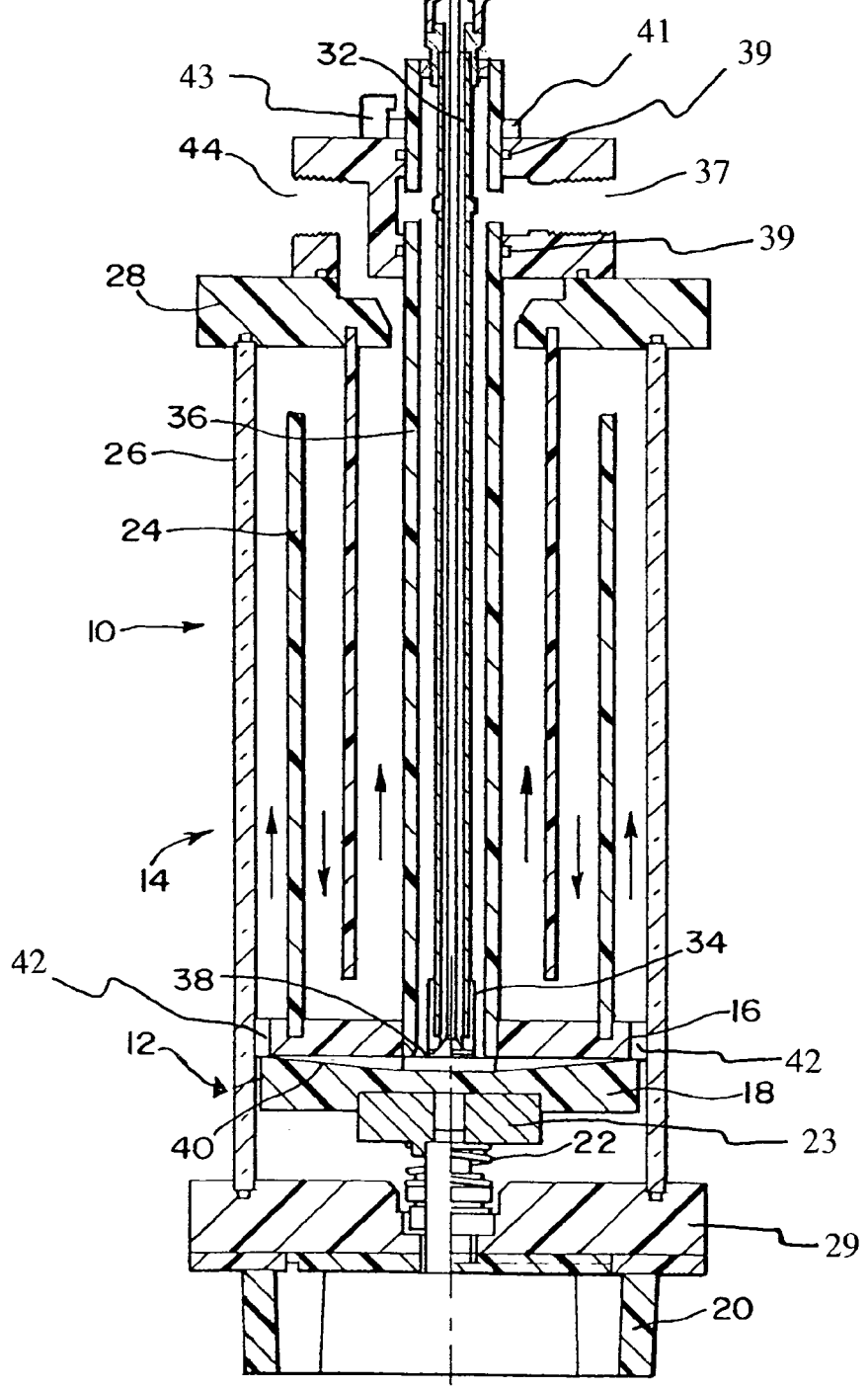
FIG. 1 is a cross-sectional view of a polymer mixing device made in accordance with the present invention.

Referring to FIGS. 1 and 2, the polymer mixing apparatus 10 has one inversion stage 12 and an activating stage 14. The inversion stage 12 includes a stator disk 16 and impeller disk 18. The stator disk 16 and impeller 18 are generally flat, and the impeller does not have the paddles found in the impellers of some known polymer mixing devices. The impeller disk 18 is rotated by a motor 20 through a seal 22 and a threaded hub 23.

The stator 16 includes protrusions 25 extending from its outside wall or edge 27. The protrusions 25 maintain the general position of the stator within a housing 26, and also create an outlet 42 of the inversion stage 12. The outlet 42 is formed in the space between the outer wall 27 of the stator 16 and the housing 26, as defined by the protrusions 25. Three or four preferably equally spaced protrusions can be used, as desired.

The activation stage 14 includes one or more baffles 24. The inversion stage 12 and the activation stage 14 are enclosed in the housing 26, and an end cap 28 is provided at the top of the activation stage 14. A bottom cap 29 closes the lower end of the inversion stage 12.

Polymer in an oil-based continuous phase emulsion enters the apparatus 10 through a polymer inlet 30. The polymer-in-oil emulsion passes through a polymer column 32 to an injection check valve 34, located in the inversion stage 12. The check valve 34 has a valve stem 35 for operating the check valve 34.

A pressurized aqueous solution such as water enters the apparatus 10 at a water inlet 37, and passes through a water conduit 36 to the inversion stage 12. O-rings 39 seal the water inlet 37, yet allow some axial movement of the water conduit 36, which is attached to the stator 16. Upward (axial) movement and rotational movement of the stator 16 is limited by a keyed collar 41 and a stop 43. Water pressure without impeller rotation pushes the stator away from the impeller. Impeller rotation creates lower pressure, though, which draws the stator closer to the impeller.

Water is delivered by externally applied pressure through an adjustable flow control device (not shown) into the mixing zone. Polymer-in-oil emulsion is delivered to the mixing zone by separate adjustable pumping apparatus (not shown). Rotation of the impeller 18, which can rotate up to perhaps 3450 rpm, draws the resulting solution through the mixing zone 38 and then through an inversion zone 40. The inversion zone 40 is a confined space, which will be described in more detail.

In the inversion zone (confined space) 40, oil is stripped from the polymer molecules and emulsified in the diluting water, exposing the polymers to the water. The polymer molecules then begin to be hydrated by the aqueous solution.

The inverted polymer molecules leave the inversion zone at the outlet 42, and the resulting solution, which is under pressure, passes through the activation stage 14, following the arrows shown in FIG. 1, in mild turbulence with low shear. However, the solution does not circulate back through the inversion stage 12. Hydration and extension can continue in the activation stage, exposing numerous ionic activation sites which can attract and capture particulate matter in wastewater.

The solution leaves the apparatus 10 at an outlet 44, and can be stored for later use or immediately placed in water to be treated. When placed in the water, the ionic activation sites capture particulate matter. The particles captured in the water add weight to the polymer molecules, and the particle-laden molecules sink to the bottom of the water, cleaning the water. The resulting particles are easily removed by various known techniques.

The impeller 18 rotates in the inversion zone 40, generating centrifugal force which adds pressure to the solution as it passes through the activation stage 14. The movement of the impeller 18 creates relatively high shear turbulence in the inversion zone 40, but the impeller 18 and stator disk 16, which form the confined space or inversion zone 40, strip and hydrate the polymer molecules by subjecting them to a substantially uniform frictional force, without generating substantial impact forces against the polymer molecules.

The confined space 40 extends both axially and radially between the stator and the impeller. The axial (Z) dimension is small compared with the radial dimension. The axial dimension can be typically 0.025 inches or less, while the radial dimension of the impeller can be about 5 inches, extending through both the X and Y dimensions. The mixing zone can have a radius of about 0.5 inches. In this example, the confined space 40 extends radially for about 4.5 inches.

The polymers are in the inversion zone 40 for a very short time, perhaps 25 milliseconds. In the inversion zone, the molecules are subjected to a uniform shear force for this predetermined time. The polymers do not recirculate through the inversion zone, though, because the centrifugal force generated by the impeller directs the polymers immediately through the exit 42, through the continuous uniform volume of the confined space 40, and the activation stage is isolated from the inversion stage by the stator. While the shear force might increase from the inside to the outside of the confined space, the shear force is substantially uniform, because the impeller surface and the stator disk surface are substantially flat.

The lowered pressure generated by the rotating impeller draws the stator closer to the impeller, limited by the solution in the inversion zone, and the stop 41. The stop 41 is particularly helpful if water pressure at the water inlet 37 is inadvertently interrupted, which would produce excessive lowered pressure in the inversion zone and might allow contact between the impeller and the stator.

The impeller 18 can take various forms, including those shown in FIGS. 3, 4, and 5. In FIG. 3, an impeller 46 has a flat surface 48 with openings 49 for mounting the impeller to the hub.

In FIG. 4, an impeller 50 also has a generally flat surface, with a plurality of circumferentially spaced vanes 52. The vanes 52 extend from an entrance 54, which is a predetermined distance from an axis 56, to a predetermined point short of an outer edge 58 of the impeller 50. The outer edge 58 is the end of the inversion zone 40.

In FIG. 5, an impeller 60 also has a flat surface 62, and a plurality of vanes 64. The vanes 64 extend from an inlet 66 to an outlet 68. The vanes 52, 64 can have any suitable shape, but preferably are recessed and tapered in two axes. Since the vanes are recessed, the polymer-in-oil solution is dispersed more rapidly throughout the inversion zone 40, and enters the more confined space between vanes on the flat surfaces 58, 62.

The vanes 52 (FIG. 4) and 64 (FIG. 5) are recessed so that the polymer molecules can extend and travel radially through the impeller and disperse more evenly along the surface of the impeller when they leave the vanes. The vanes provide a convenient way to control the time the polymer molecules are subjected to shear forces in the confined space, and disperse the polymer solution more quickly.

After inversion in the confined space 40, the oil is substantially stripped from the polymer molecules, and the polymer molecules become hydrated both in the confined space 40 and in the activation zone 14.

While the principles of the invention have been described above in connection with specific apparatus and applications, it is to be understood that this description is made only by way of example and not as a limitation on the scope of the invention.

What is claimed is:

1. Apparatus for stripping oil from polymers in an oil phase continuous emulsion and at least partially hydrating the polymers comprising:

means for injecting the emulsion into a mixing zone;

means for injecting a pressurized aqueous solution into the mixing zone;

means for passing the emulsion and solution from the mixing zone through a confined space, and stripping and at least partially hydrating the polymer molecules in the confined space, the resulting solution passing through the confined space for a predetermined time; and means for removing the resulting solution from the confined space without recirculation through the confined space;

wherein the means for injecting the pressurized aqueous solution includes a water inlet and a water conduit extending from the water inlet to the mixing zone, the apparatus further comprising O-rings which seal the water inlet, yet allow some axial movement of the water conduit, the water conduit being attached to a fixed stator which forms part of the confined space, upward movement and rotational movement of the stator being limited by a keyed collar and a stop, the confined space also having a rotating impeller, so that water pressure without impeller rotation pushes the stator away from the impeller, and impeller rotation creates lower pressure, which draws the stator closer to the impeller.

2. The apparatus of claim 1, wherein the passing means includes a fixed stator and a rotating impeller, the fixed stator forming one side of the confined space, and the impeller forming another side of the confined space.

3. The apparatus of claim 2, wherein the mixing zone is centered around the axis of the impeller, the confined space extending between a first predetermined distance from the axis and a second predetermined distance from the axis.

4. The apparatus of claim 2, wherein the impeller includes a plurality of spaced recessed vanes, the vanes being tapered radially and axially.

5. The apparatus of claim 4, wherein the vanes extend to the second predetermined distance.

6. The apparatus of claim 2, wherein the confined space extends both axially and radially between the stator and the impeller, the axial (Z) dimension being smaller than the radial dimensions (X and Y).

7. The apparatus of claim 6, wherein the axial dimensions of the confined space of the confined space is about 0.025 inches or less, and the radial dimension of the impeller is about 5 inches, extending through both the X and Y dimensions, the mixing zone having a radius of about 0.5 inches, so that the confined space extends radially for about 4.5 inches.

8. The apparatus of claim 2, wherein the emulsion and solution are in the confined space for about 25 milliseconds.

9. The apparatus of claim 2, wherein the polymers are subjected to a substantially uniform shear force in the confined space.

10. The apparatus of claim 1, wherein the polymers are subjected to a substantially uniform frictional force in the confined space, without generating substantial impact forces against the polymers.

11. The apparatus of claim 1, wherein the means for removing the resulting solution from the confined space includes a fixed stator having a plurality of protrusions extending from an outside edge, the protrusions maintaining the general position of the stator within a housing, and creating an outlet from the confined space into an activating stage, the fixed stator preventing recirculation of the resulting solution through the confined space.

12. The apparatus of claim 1, wherein the means for injecting the emulsion into the mixing zone includes a polymer inlet, an injection check valve and a valve stem for operating the check valve.

13. The apparatus of claim 1, wherein the polymers are further hydrated in an activation stage after the polymers leave the confined space, the polymers being subjected to relatively mild turbulence with low shear in the activation stage.

* * * * *